US009979702B2

(12) United States Patent
Nugent et al.

(10) Patent No.: US 9,979,702 B2
(45) Date of Patent: *May 22, 2018

(54) PERSISTENT HOUSEHOLD KEYS FOR IN-HOME MEDIA CONTENT DISTRIBUTION

(71) Applicant: ARRIS Enterprises, Inc., Suwanee, GA (US)

(72) Inventors: Paul Adrian Nugent, Larne (GB); Sven Tomas Hassler, Linkoping (SE); Paul Richard Osborne, Auckland (NZ)

(73) Assignee: ARRIS Enterprises LLC, Suwanee, GA (US)

( * ) Notice: Subject to any disclaimer, the term of this patent is extended or adjusted under 35 U.S.C. 154(b) by 92 days.

This patent is subject to a terminal disclaimer.

(21) Appl. No.: 14/483,396

(22) Filed: Sep. 11, 2014

(65) Prior Publication Data

US 2015/0074399 A1    Mar. 12, 2015

Related U.S. Application Data

(60) Provisional application No. 61/877,049, filed on Sep. 12, 2013.

(51) Int. Cl.
*H04N 21/4408* (2011.01)
*H04L 29/06* (2006.01)
(Continued)

(52) U.S. Cl.
CPC ........ *H04L 63/0428* (2013.01); *H04L 63/065* (2013.01); *H04L 65/604* (2013.01);
(Continued)

(58) Field of Classification Search
CPC ..... H04L 63/062; H04L 63/064; H04L 9/083; H04N 21/4408
See application file for complete search history.

(56) References Cited

U.S. PATENT DOCUMENTS 7,231,516 B1 * 6/2007 Sparrell ................ H04N 5/783
348/E7.056
7,305,087 B1   12/2007 Ques et al.
(Continued)

FOREIGN PATENT DOCUMENTS

EP      1187391 A2    3/2002
WO   03/034408 A2    4/2003
(Continued)

OTHER PUBLICATIONS

PCT Invitation to Pay Add'l Fees (Form ISA/206) RE: Application No. PCT/US2014/055268; dated Nov. 18, 2014.
(Continued)

*Primary Examiner* — Farid Homayounmehr
*Assistant Examiner* — Zhimei Zhu
(74) *Attorney, Agent, or Firm* — Thomas A. Ward

(57) ABSTRACT

A method of enabling media recording compatibility between client devices, comprising provisioning a first client device associated with a subscriber identifier with a household key also associated with the subscriber identifier, receiving a media content stream at the first client device, the media content stream having been encrypted by a content provider, decrypting the media content stream at the first client device, creating a recording with the first client device by digitally recording a portion of the media content stream, encrypting the recording with the household key at the first client device, saving the recording to a memory device, and loading the recording onto a second client device that has also been provisioned with the household key, the second client device also being associated with the subscriber identifier, such that the second client device uses the household key to decrypt and play back the recording.

17 Claims, 6 Drawing Sheets

(51) Int. Cl.
*H04N 21/433* (2011.01)
*H04N 21/436* (2011.01)
*H04N 21/4627* (2011.01)

(52) U.S. Cl.
CPC ... *H04N 21/4334* (2013.01); *H04N 21/43615* (2013.01); *H04N 21/4408* (2013.01); *H04N 21/4627* (2013.01); *H04L 63/0464* (2013.01); *H04L 63/062* (2013.01); *H04L 2463/062* (2013.01)

(56) References Cited

U.S. PATENT DOCUMENTS

| | | | | |
|---|---|---|---|---|
| 7,983,423 | B1* | 7/2011 | Agarwal | H04L 9/0891 380/278 |
| 2004/0030721 | A1* | 2/2004 | Kruger | G06F 11/1461 |
| 2005/0086532 | A1 | 4/2005 | Lotspiech et al. | |
| 2005/0228988 | A1* | 10/2005 | Traw | H04L 9/083 713/158 |
| 2006/0074807 | A1 | 4/2006 | Gauba et al. | |
| 2006/0098957 | A1* | 5/2006 | Jeong | H04N 5/76 386/265 |
| 2006/0179478 | A1* | 8/2006 | Han | H04L 9/0822 726/5 |
| 2007/0260808 | A1* | 11/2007 | Raines | H04N 5/4403 711/100 |
| 2007/0294178 | A1* | 12/2007 | Pinder | G06F 21/10 705/57 |
| 2008/0170693 | A1* | 7/2008 | Spies | G06F 21/6209 380/277 |
| 2012/0278566 | A1* | 11/2012 | Gilson | G06F 12/00 711/159 |
| 2013/0142499 | A1* | 6/2013 | Major | H04N 21/2323 386/341 |
| 2014/0281489 | A1* | 9/2014 | Peterka | H04L 63/0464 713/153 |
| 2016/0036813 | A1* | 2/2016 | Wakumoto | H04L 63/0272 713/171 |

FOREIGN PATENT DOCUMENTS

| | | |
|---|---|---|
| WO | 03/098931 A1 | 11/2003 |
| WO | 2005/101411 A2 | 10/2005 |

OTHER PUBLICATIONS

PCT Search Report & Written Opinion, RE: Application No. PCT/US2014/055268; dated Feb. 27, 2015.

* cited by examiner

PERSISTENT HOUSEHOLD KEYS FOR IN-HOME MEDIA CONTENT DISTRIBUTION

CLAIM OF PRIORITY

This Application claims priority under 35 U.S.C. § 119(e) from earlier filed U.S. Provisional Application Ser. No. 61/877,049, filed Sep. 12, 2013, which is incorporated by reference herein in its entirety.

TECHNICAL FIELD

The present disclosure relates to the field of digital copy protection, particularly a system and method for providing a household key tied to a particular subscriber that can be shared with different devices associated with the subscriber.

BACKGROUND

Consumers have come to enjoy watching recorded television broadcasts through devices such as digital video recorders (DVRs) or personal video recorders (PVRs). These devices commonly contain local storage, such as hard drives or other memory, upon which users often record many hours of television content.

Because users expect the content they record onto their device's local storage to be safely stored such that it can be played back at any time, it can be distressing for users when the content is lost or becomes unplayable. However, such situations are common. For instance, a DVR's hard drive can fail and the content stored on it can be lost. As another example, when an existing DVR is replaced with a newer model, recorded content on the previous DVR is not automatically transferred to the new model and access to the recorded content is lost.

Some systems have been developed that allow recorded content on a DVR to be backed up or stored on an external drive, or to be uploaded to the cloud. However, content recorded by a DVR is often encrypted by the DVR with a device-specific encryption key that is unique to the particular DVR that recorded the content. In most existing systems it would be fruitless to load backed up encrypted content to a new DVR after an old DVR fails or is replaced, or to share recorded content with other devices, because the new DVR or other device does not have the same device-specific encryption key as the DVR that recorded the content and therefore could not decrypt the recorded content for playback. Even if the content could be transferred to a new device, in most existing systems it would need to be decrypted using the device-specific encryption key of the device that initially recorded the content, and then re-encrypted using the device-specific encryption key of the new device.

Some digital rights management systems have been developed, such as the Open Mobile Alliance Digital Rights Management (OMA DRM) specification, that provide a shared domain key to one or more devices tied to the same domain. In these systems a content provider initially protects media content with the domain key and provides the DRM-protected content to a client device in the domain. The receiving client device can then share the DRM-protected content with other client devices within the domain that also have the shared domain key. While these systems can allow multiple devices to share DRM-protected content that was initially received in protected form from a content provider, they do not allow content recorded by a DVR that was encrypted locally by the DVR to be shared with other DVRs or devices tied to the same subscriber account, or to be loaded onto a secondary or replacement device tied to the same subscriber account if the device that initially recorded and encrypted the content fails.

SUMMARY

What is needed is a system and method for providing a shared household key to one or more client devices associated with the same subscriber. The household key can be associated with a particular subscriber's account, and thus can be shared with any client device that is linked with that subscriber's account. Rather than encrypting media content with a device-specific key that is unique to the particular client device that records the media content, the client devices associated with a subscriber can encrypt the media content with the shared household key associated with that subscriber, such that the media content can be decrypted and played back by any other client device associated with the subscriber that also has the shared household key. For instance, a DVR can encrypt recorded content with a household key tied to a subscriber account. When a new DVR is linked with that subscriber account, the household key can be provisioned onto the new DVR. If recorded content from the old DVR is loaded onto the new DVR, for example directly from the old DVR or from a backup on an external drive, the new DVR can decrypt and play back the loaded content using the shared household key.

In one embodiment, the present disclosure provides a method of enabling media recording compatibility between client devices, the method comprising provisioning a first client device associated with a subscriber identifier with a household key also associated with the subscriber identifier, receiving a media content stream at the first client device, the media content stream having been encrypted by a content provider, decrypting the media content stream at the first client device, creating a recording with the first client device by digitally recording a portion of the media content stream, encrypting the recording with the household key at the first client device, saving the recording to a memory device, and loading the recording onto a second client device that has also been provisioned with the household key, the second client device also being associated with the subscriber identifier, such that the second client device uses the household key to decrypt and play back the recording.

In another embodiment, the present disclosure provides a method of enabling media recording compatibility between client devices, the method comprising determining whether one or more client devices are associated with a particular subscriber identifier, and providing a shared household key to each of the one or more client devices that is associated with the particular subscriber identifier, wherein each of the one or more client devices uses the shared household key to encrypt and/or decrypt recordings of media content such that recordings made by a first client device that is associated with the particular subscriber identifier and that are encrypted by the first client device using the shared household key are playable on a second client device that is associated with the particular subscriber identifier.

In another embodiment, the present disclosure provides a method of enabling media recording compatibility between client devices, the method comprising transferring a recording from a first memory device to a second memory device, the recording having been made by a first client device and having been encrypted by the first client device using a household key, and the second memory device being accessible by a second client device, and provisioning the household key onto the second client device, such that the second client device is configured to use the household key to decrypt and play back the recording from the second memory device, wherein the first client device and the second client device are both associated with the same subscriber identifier, and the household key is associated with the subscriber identifier.

BRIEF DESCRIPTION OF THE DRAWINGS

Further details of the present invention are explained with the help of the attached drawings in which.

DETAILED DESCRIPTION

Figure 1:
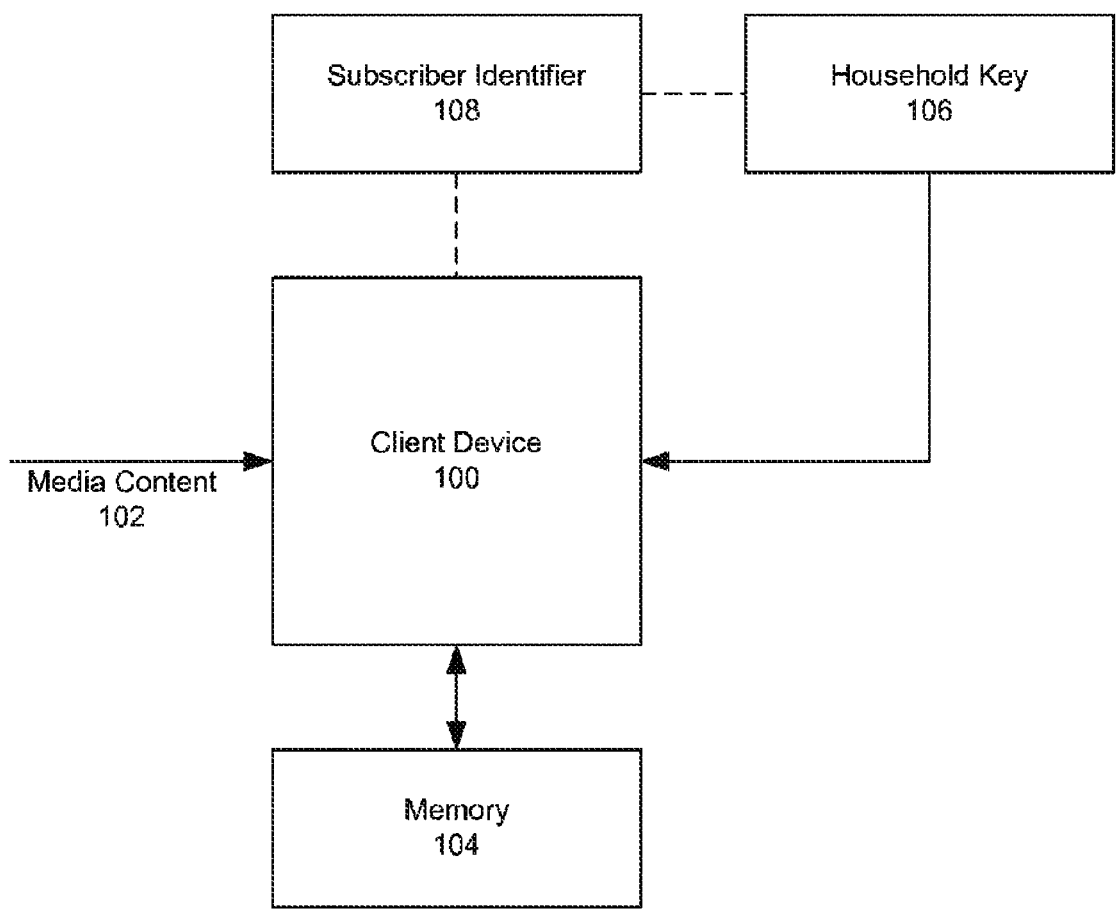
FIG. 1 depicts an exemplary embodiment of a client device.

FIG. 1 depicts a system in which a client device 100 is configured to receive and/or play back media content 102. A client device 100 can be a digital video recorder (DVR), personal video recorder (PVR), media player, home media server, set-top box, computer, mobile device, gaming console, or any other device configured to receive and/or play back media content 102. In some embodiments, media content 102 can be video and/or audio content received by the client device 100. By way of a non-limiting example, a client device 100 can be part of, and/or be connected to, a set-top box that is configured to receive a cable, satellite, or over-the-air television signal.

Figure 2:
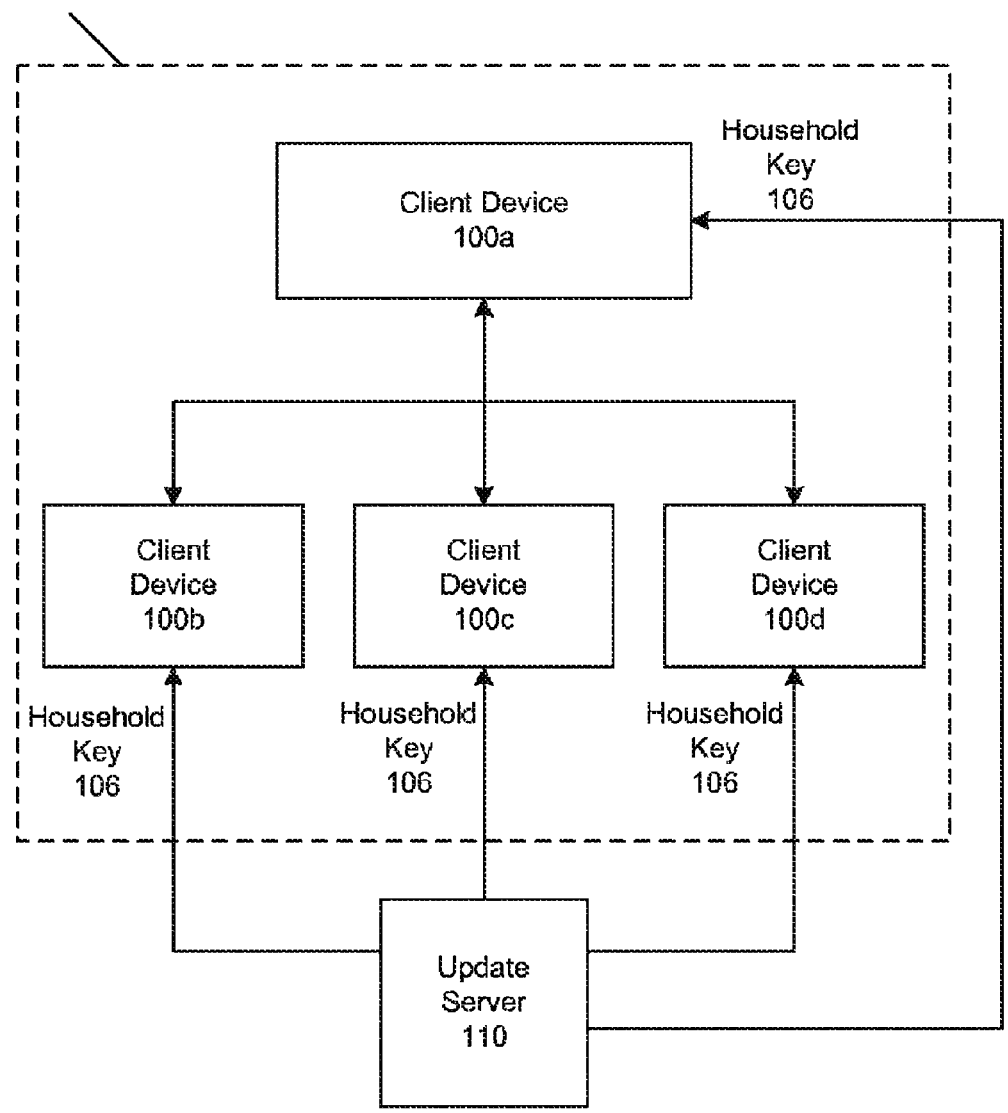
FIG. 2 depicts an exemplary embodiment of a system comprising multiple client devices in communication with an update server.

The client device 100 can comprise or be linked to memory 104. In some embodiments, the memory 104 can be local memory within the client device 100, such as an internal hard drive, flash memory, or any other type of data storage device. In other embodiments, the memory 104 can be external memory 104 plugged into the client device 100 through USB, SATA or any other connection, such as an external and/or removable disk drive or flash memory. In still other embodiments, the memory 104 can be remotely connected to the client device 100 through a network data connection, such as Network Attached Storage (NAS), a cloud storage solution or a remote server. In yet other embodiments, a first client device 100 can be connected to a second client device 100 over a network or other data connection, as shown in FIG. 2, and the first client device 100 can be configured access and/or store data on the second client device's memory 104.

A client device 100 can be configured to digitally record selected media content 102 onto memory 104, and/or play back recorded media content 102 from memory 104. In some embodiments, the incoming media content 102 can be received in encrypted form in which the content stream is encrypted with a digital rights management (DRM) scheme. In these embodiments, the client device 100 can obtain DRM credentials, such as digital certificates and/or keys, from a content provider or service provider's digital rights management system in order to decrypt the encrypted stream media content 102 it receives. The client device 100 can record non-encrypted or decrypted media content 102 into memory 104.

When a client device 100 records media content 102 onto memory 104, it can encrypt that media content 102 with a household key 106. In embodiments and/or situations in which the media content 102 was initially encrypted with a DRM scheme and was decrypted by the client device 100 using DRM credentials, the client device 100 can re-encrypt the media content 102 with the household key 106 when it records the media content 102.

The household key 106 can be a cryptographic key linked to a particular subscriber identifier 108. The subscriber identifier 108 can uniquely identify a particular subscriber to a service provider's services. By way of a non-limiting example, a cable service provider can assign a unique subscriber identifier 108 to each of its subscribers. The subscriber identifier 108 can be a username, number, alphanumeric string, or any other identifier.

As shown in FIG. 2, multiple client devices 100 can be associated with the same subscriber identifier 108. By way of a non-limiting example, a subscriber and/or others in the subscriber's household can own, rent, or otherwise possess multiple client devices 100. Each client device 100 held by the subscriber or another member of the subscriber's household can be linked to the subscriber's unique subscriber identifier 108 and be authorized to receive services from the service provider.

A household key 106 associated with a subscriber identifier 108 can be provided by an update server 110 to any or all client devices 100 tied to that subscriber identifier 108. In some embodiments, the update server 110 can be operated by the same service provider that issues the subscriber identifiers 108. In other embodiments, the update server 110 can be operated by the manufacturer of the client devices 100, a third party partnering with the service provider and/or manufacturer, or any other entity.

Each client device 100 can store the household key 106, such that content recorded on one client device 100 and encrypted with the household key 106 can be decrypted by a different client device 100 using the same household key 106. In some embodiments, each client device 100 can comprise a secure processing chip that has an area of non-volatile memory in which the household key 106 can be stored. In other embodiments, each client device 100 can store the household key 106 in memory 104, or at any other desired location.

As described above, multiple client devices 100 can be linked to the same subscriber identifier 108, and each client device 100 can be provisioned with the same household key 106 such that any client device 100 can access, decrypt, and/or play back recordings of media content 102 made by any other client device 100 associated with the same subscriber identifier 108. By way of a non-limiting example, FIG. 2 depicts an embodiment in which a primary client device 100a on the subscriber's home network can be configured to make and encrypt recordings, while other client devices 100b, 100c, and 100d on the same home network can be configured to access and play back recordings made by the primary client device 100a, and/or schedule recordings to be performed by the primary client device 100a. In this exemplary embodiment, because client devices 100b, 100c, and 100d have been provisioned with the same household key 106 as the primary client device 100a, they can decrypt and play back the recordings made by the primary client device 100a using the household key 106. In alternate embodiments, each of the client devices 100 can make and encrypt their own recordings with the household key 106, and each client device 100 can access recordings made and encrypted by any other client device 100 using the shared household key 106.

In some embodiments in which client devices 100 are configured to share and transfer recorded media content with other client devices 100 over a network, such as in the embodiment shown in FIG. 2, an additional copy protection and/or digital rights management (DRM) scheme can be in place to protect recordings as they are transferred from one client device 100 to another. In these embodiments, the household key 106 can be used to initially encrypt any recordings of media content 102 that are made by a client device 100, as described above. If recordings are to be transferred from the recording client device 100 to a different client device 100, an additional DRM or copy protection scheme can be used to protect the transmission of the already-encrypted recordings between client devices 100. By way of a non-limiting example, DTCP-IP (Digital Transmission Content Protection over Internet Protocol) link protection can be used to protect distribution of recordings from one client device 100 to another within the same home network.

Figure 3:
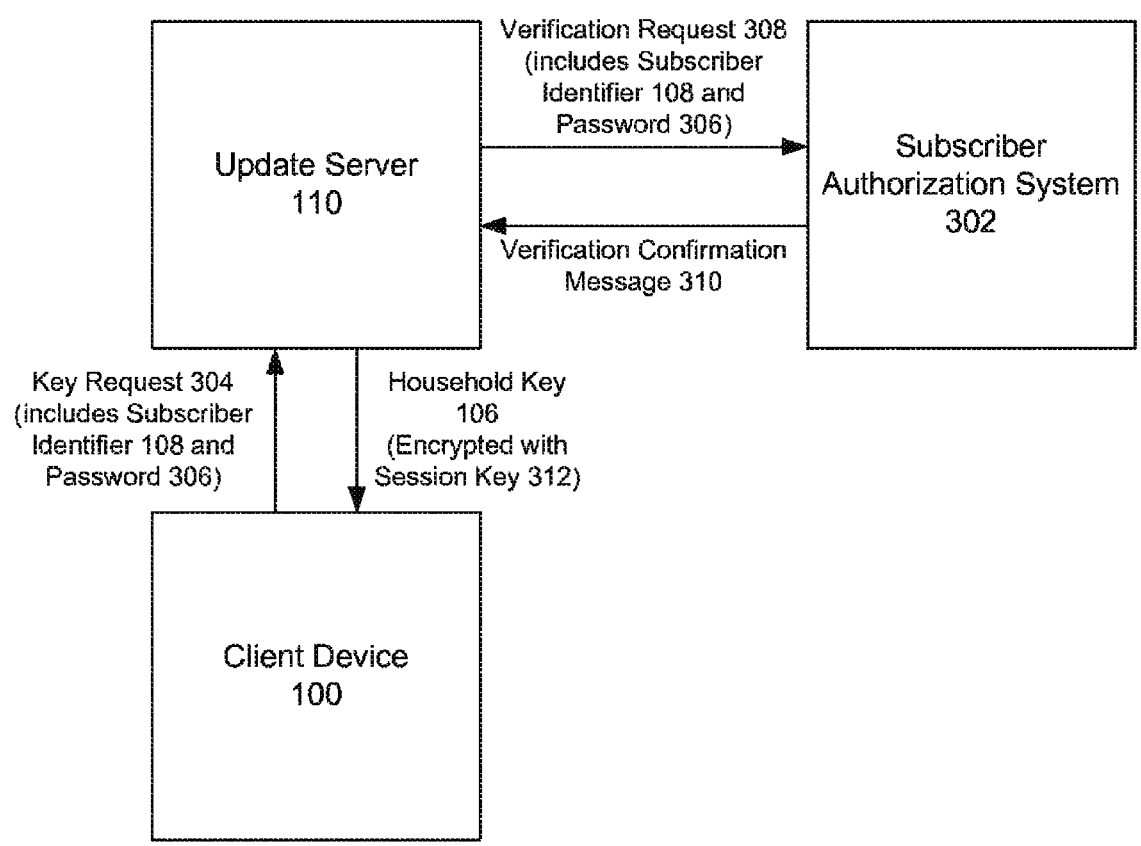
FIG. 3 depicts an exemplary embodiment of an operating environment in which an update server is in communication with a client device and a subscriber authorization system.

As discussed above, an update server 110 can be configured to provide a household key 106 to each client device 100 associated with the same subscriber identifier 108. In some embodiments, the update server 110 can be in communication with a service provider to determine whether a client device 100 has been associated with a subscriber identifier 108, whether the subscriber identifier 108 is associated with the service provider's services, and/or whether a household key 106 should be provided to a client device 100 that requests one. By way of a non-limiting example, FIG. 3 depicts an exemplary operating environment for provisioning a client device 100 with a household key 106. As shown in FIG. 3, a client device 100 can be in data communication with an update server 110, and the update server 110 can in turn be in data communication with a service provider's subscriber authorization system 302. In some embodiments, the client device 100 and/or update server 110 can additionally be in data communication with the service provider's digital rights management system.

Figure 4A:
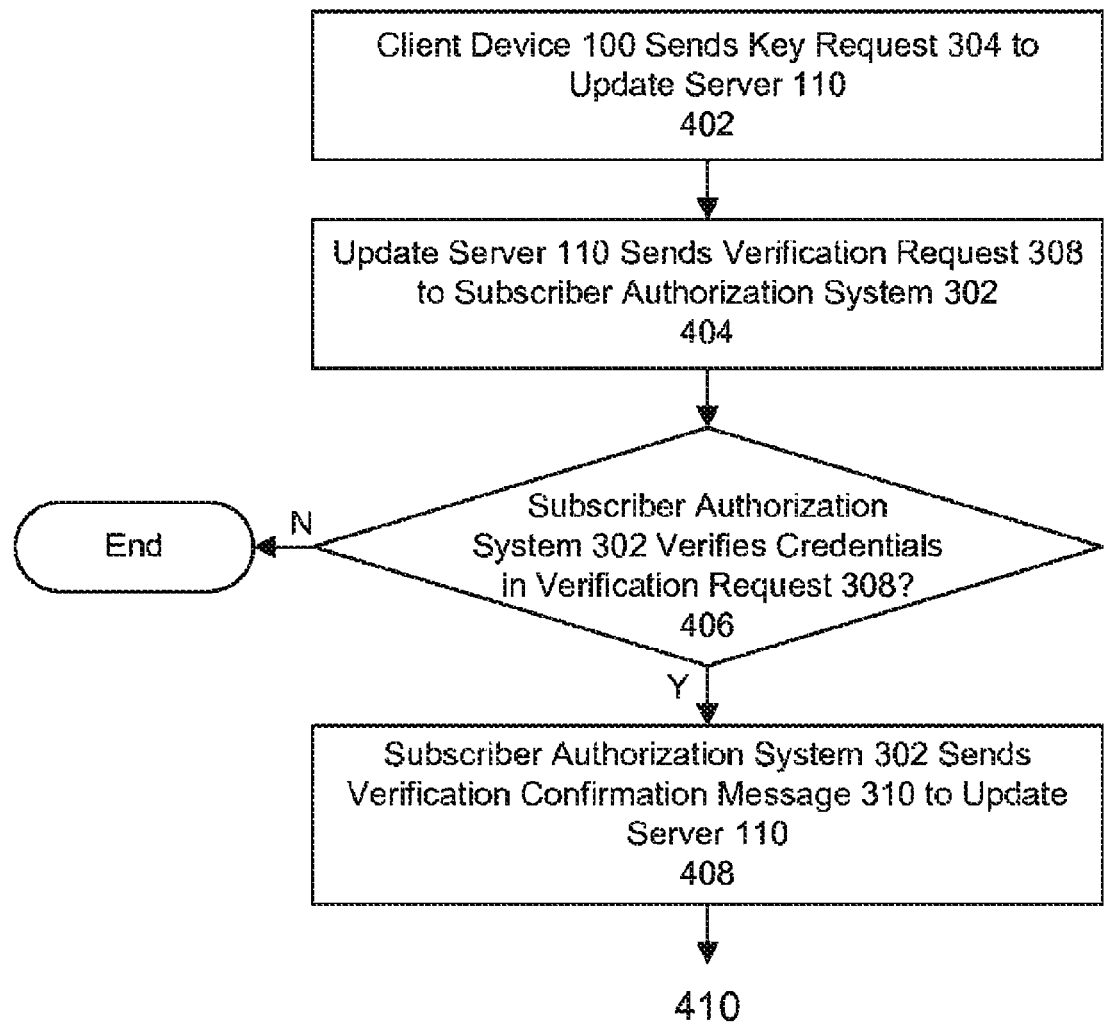
FIGS. 4A-4B depict an exemplary method for provisioning a client device with a household key.
Figure 4B:
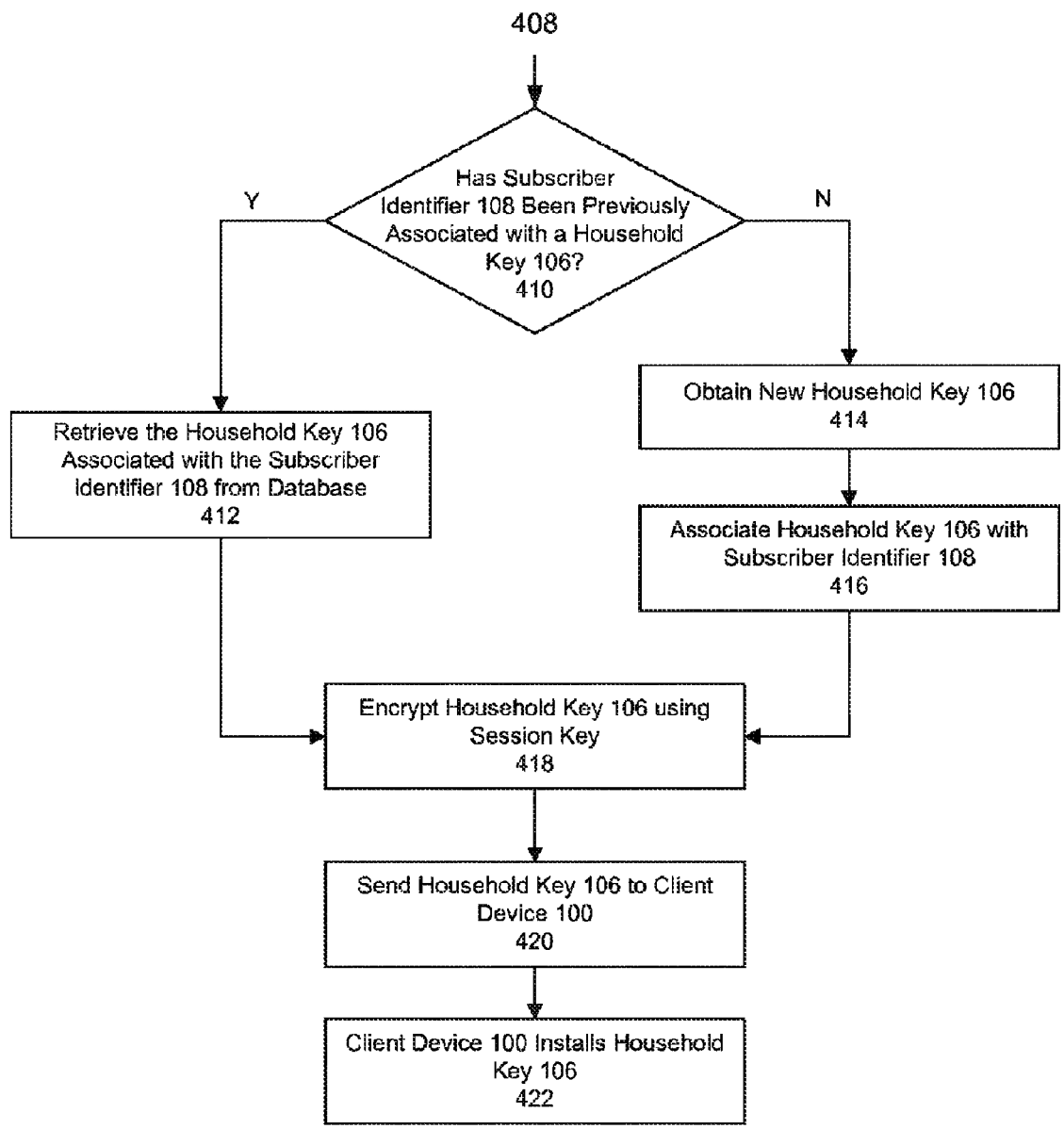

FIG. 4 depicts one non-limiting exemplary embodiment of a method for provisioning a client device 100 with a household key 106 using the operating environment of FIG. 3. At step 402, the client device 100 can request a household key 106 by sending a key request 304 to the update server 110. The key request 304 can comprise a subscriber identifier 108 and a subscriber credential 306. In some embodiments, the subscriber credential 306 can be a password. In other embodiments, the subscriber credential 306 can be a secret key, a one-time password, a digitally signed and/or encrypted cookie that can validate the subscriber identifier 108, a Kerberos ticket, and/or any other type of credential. By way of a non-limiting example, a user who desires to set up a new client device 100 can enter a subscriber identifier 108 into the client device 100, along with the password associated with the subscriber identifier 108. By way of another non-limiting example, a user who desires to set up a new client device 100 can obtain a one-time password by requesting that the service provider send a one-time password to the subscriber's mobile phone via text/SMS message, and the user can then input that one-time password into the client device 100 during set-up. By way of yet another non-limiting example, a Kerberos ticket can have previously been provided to the client device 100 through the service operator's trusted third party (TTP). The subscriber identifier 108 and subscriber credential 306 can be forwarded to the update server 110 as part of the key request 304 from the client device 100.

At step 404, the update server 110 can send a verification request 308 to the subscriber authorization system 302. The verification request 308 can include the subscriber identifier 108 and subscriber credential 306 received by the update server 110 from the client device 100 as part of the key request 304. In some embodiments, the key request 304 can be signed by the client device 100 using a device signature with a signing key and digital certificate unique to the client device 100, and the update server 110 can verify the device signature prior to sending the verification request 308 to the subscriber authorization system 302.

At step 406, the subscriber authorization system 302 can consult a database of subscriber information to check whether the subscriber credential 306 sent as part of the verification request 308 is a valid subscriber credential 306 associated with the subscriber identifier 108 in the service provider's records, and/or whether the subscriber identifier 108 is associated with a current subscriber to the service provider's services. If the credentials in the verification request 308 are verified by the subscriber authorization system 302, the subscriber authorization system 302 can return a verification confirmation message 310 to the update server 110 at step 408. The verification confirmation message 310 can signify to the update server 110 that the subscriber authorization system 302 has validated the subscriber identifier 108 and subscriber credential 306. If the subscriber authorization system 302 does not validate the verification request 308, the process can end.

At step 410, after the update server 110 has received a verification confirmation message 310 from the subscriber authorization system 302, the update server 110 can determine whether a household key 106 has previously been associated with the subscriber identifier 108. The update server 110 can maintain a database of household keys 106 and their associations with subscriber identifiers 108, and the update server 110 can check the database to determine if the subscriber identifier 108 has previously been associated with a household key 106.

If the update server 110 determines from its database during step 410 that a household key 106 has previously been associated with the subscriber identifier 108, such as if a household key 106 has already been provided to one or more client devices 100 associated with the subscriber identifier 108, the update server 110 can retrieve the household key 106 associated with the subscriber identifier 108 from its database at step 412, and then move to step 418.

If the update server 110 determines during step 410 that no household key 106 has previously been associated with the subscriber identifier 108, such as if the key request 304 is the first key request 304 originating from any client device 100 associated with the subscriber identifier 108, the update server can move to step 414.

At step 414, after the update server 110 has determined that no household key 106 has previously been associated with the subscriber identifier 108, the update server 110 can obtain a new household key 106.

In some embodiments, during step 414 the update server 110 can generate a new household key 106 on demand and then move to step 416.

In other embodiments, during step 414 the update server 110 can retrieve a previously generated household key 106 from a pool 502 of unassociated household keys 106 maintained by the update server 110, and then move to step 416. The pool 502 of unassociated household keys 106 can contain household keys 106 previously generated by the update server 110, and/or household keys 106 previously generated by an external key manager 504 that have been loaded onto the update server 110.

Figure 5:
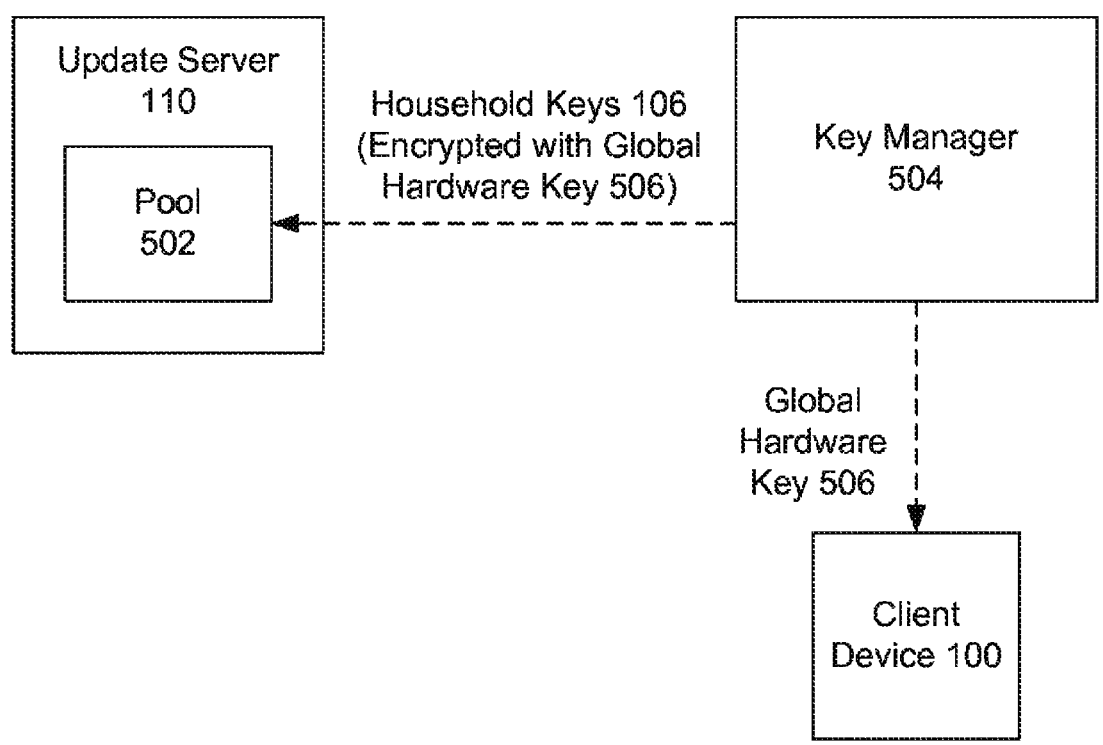
FIG. 5 depicts an exemplary embodiment of a system in which an external key manager generates household keys to be loaded into a pool at an update server.

FIG. 5 depicts an exemplary embodiment in which an external key manager 504 generates household keys 106 to be loaded into the update server's pool 502. In some embodiments, the key manager 504 can be offline, and the household keys 106 generated by the offline key manager 504 can be manually loaded onto the update server 110 using removable media or storage. In other embodiments, the household keys 106 can be loaded onto the update server 110 from the key manager 504 over a network connection. In some embodiments, the key manager 504 can have encrypted the household keys 106 using a global hardware key 506, and the household keys 106 can be loaded into the update server's pool 502 in encrypted form. The global hardware key 506 can be shared with the client device 100 and stored in a chip within the client device 100. By way of a non-limiting example, the operator of the key manager 504 can share the global hardware key 506 with the manufacturer of the client device 100 or the manufacturer of a chip incorporated into the client device 100, such that the client device 100 can be provisioned with the global hardware key 506 during manufacturing. In these embodiments, the client device 100 can later decrypt the household key 106 using the global hardware key 506 when it receives the household key 106 from the update server 110 during step 422. In alternate embodiments, the household keys 106 can be provided to the update server 110 from the key manager 504 in unencrypted form.

At step 416, after the update server 110 has obtained a new household key 106 either by generating it itself on demand or by retrieving it from a pool 502 of previously generated unassociated household keys 106, the update server 110 can associate the household key 106 obtained during step 414 with the subscriber identifier 108 in its database. By associating the new household key 106 with the subscriber identifier 108 in the update server's database, the next time a client device 100 associated with the subscriber identifier 108 submits a key request 304 to the update server 110, the update server 110 can determine at step 410 that the subscriber identifier 108 has already been associated with a household key 106, and it can retrieve and provide the appropriate household key 106 to the client device 100 through steps 412, 418, and 420.

At step 418, the update server 110 can encrypt the household key 106 retrieved during step 412 or obtained during step 414 with a session key 312, and can then send the encrypted household key 106 to the client device 100 at step 420. The session key 312 can be established through a key agreement between the update server 110 and client device 100 when the update server 110 and client device 100 are engaged in a communications session over a network. By way of a non-limiting example, the session key 312 can be an Advanced Encryption Standard (AES) key such as a key derived through a Diffie-Hellman key agreement between the update server 110 and client device 100.

At step 422, the client device 100 can decrypt and install the household key 106 received from the update server 110 during step 420. The client device 100 can use the session key 312 to decrypt one layer of encryption from the household key 106. In some embodiments in which the household key 106 was originally generated by a key manager 504 and the household key 106 was separately encrypted with a global hardware key 506, the client device 100 can use the global hardware key 506 to additionally decrypt a second layer of encryption from the household key 106. After decrypting the household key 106 using the session key 312 and/or global hardware key 506, the client device 100 can install the household key 106 for later use as described below.

After being provisioned with a household key 106, either through the process of FIG. 4 or through any other process, a client device 100 can use the household key 106 to encrypt any recordings of media content 102 it makes. As mentioned above, in some embodiments the stream of media content 102 initially received by the client device 100 can be encrypted with a DRM scheme by a content provider or service provider. If the incoming media content 102 is encrypted, the client device 100 can decrypt the encrypted media content 102 stream using DRM credentials received from the content provider or service provider, record the media content 102 onto memory 104, and re-encrypt the recorded media content 102 using the household key 106.

Client devices 100 provisioned with a household key 106 can also decrypt and play back recordings of media content 102 that were encrypted with the same shared household key 106, such as recordings made by other client devices 100 associated with the same subscriber identifier 108. By way of a non-limiting example, if a client device 100 fails, but recordings it had made and that were encrypted with the household key 106 were backed up onto external memory 104, the recordings can be loaded from the external memory 104 onto a replacement client device 100. Because the replacement client device 100 can be associated with the same subscriber identifier 100 as the failed client device 100, it can be provisioned with the same household key 106 as the failed client device 100. The replacement client device 100 can then use the household key 106 to play back the recordings originally made and encrypted by the failed client device 100.

By way of another non-limiting example, in some embodiments client devices 100 can access recordings stored on backup drives, servers, or other client devices 100 over a network, such as in the embodiment shown in FIG. 2. In these embodiments, recordings made by each client device 100 can have been encrypted using the same shared household key 106 because each is associated with the same subscriber identifier 108, and so any client device 100 associated with the subscriber identifier 108 can use the shared household key 106 to decrypt and play back recordings made by any other client device 100 that were encrypted with the shared household key 106. In some embodiments, a DRM scheme or mechanism approved by the Digital Transmission Licensing Administrator (DTLA), such as DTCP-IP, can be used in addition to the household key 106 to protect recordings as they are transferred from one client device 100 to another over a network.

In some embodiments, each client device 100 can comprise a secure processor that can decrypt and/or re-encrypt the media content 102 using DRM credentials, household keys 106, and/or copy protection credentials such as DTCP-IP certificates and keys as describe above. Performing the various decryption and re-encryption steps with the secure processor of the client device 100 can help prevent exposing the media content 102 in clear decrypted form on external device pins such that it would be available to be accessed and/or copied by non-approved devices that are not associated with the subscriber identifier 108.

In some embodiments, in addition to providing client devices 100 with household keys 106 as described above, the update server 110 can separately provide client devices 100 with DRM credentials and/or copy protection credentials such as DTCP-IP certificates and keys once the client devices 100 and/or the subscriber identifier have been authorized by a service provider. In other embodiments, the update server 110 can be dedicated to providing household keys 106 to client devices 100.

Although the invention has been described in conjunction with specific embodiments thereof, it is evident that many alternatives, modifications and variations will be apparent to those skilled in the art. Accordingly, the invention as described and hereinafter claimed is intended to embrace all such alternatives, modifications and variations that fall within the spirit and broad scope of the appended claims.

What is claimed:

1. A method of enabling media recording compatibility between client devices, comprising:
provisioning a first client device associated with a subscriber identifier with a household key also associated with said subscriber identifier;
receiving a media content stream at said first client device, said media content stream having been encrypted by a content provider;
decrypting said media content stream at said first client device;
creating a recording with said first client device by digitally recording a portion of said media content stream;
encrypting said recording with said household key at said first client device;
saving said recording to a memory device; and
loading said recording onto a second client device that has also been provisioned with said household key, said second client device also being associated with said subscriber identifier, such that said second client device uses said household key to decrypt and play back said recording,
wherein the household key is limited for use to encrypt and decrypt content stored on the first client device, the second client device and other client devices in a group of client devices located within a household,
wherein when one of the group of client devices in the household has content encrypted with the household key the content can be played back after being received from another one of the group of client devices in the household and decrypted, and
wherein the household key is provided from an update server to the group of devices, with the household key and the associated subscriber identifier being provided only to devices within the household identified by the subscriber identifier, the update server being operated by the manufacturer of the group of devices.

2. The method of claim 1, wherein said memory device is a backup drive directly connected to said first client device.

3. The method of claim 1, wherein said memory device is an internal hard drive within said first client device.

4. The method of claim 1, wherein said memory device is remote storage accessible by said first client device.

5. The method of claim 1, wherein loading said recording onto said second client device comprises connecting said memory device to said second client device.

6. The method of claim 1, wherein loading said recording onto said second client device comprises transferring said recording from said memory device to said second client device over a home network.

7. The method of claim 6, wherein DTCP-IP link protection is used to protect said recording as it is transferred over said home network.

8. A method of enabling media recording compatibility between client devices, comprising:
determining whether one or more client devices are associated with a particular subscriber identifier; and
providing a shared household key to each of said one or more client devices that is associated with said particular subscriber identifier, wherein each of said one or more client devices uses said shared household key to encrypt and/or decrypt recordings of media content such that recordings made by a first client device that is associated with said particular subscriber identifier and that are encrypted by said first client device using said shared household key are playable on a second client device that is associated with said particular subscriber identifier,
wherein the shared household key is limited for use to encrypt and decrypt content stored on the first client device, the second client device and other client devices in a group of client devices located within a household, and
wherein when one of the group of client devices in the household has content encrypted with the shared household key the content can be played back after being received from another one of the group of client devices in the household, and
wherein the household key is provided from an update server to the group of devices, with the household key and the associated subscriber identifier being provided only to devices within the household identified by the subscriber identifier, the update server being operated by the manufacturer of the group of devices.

9. The method of claim 8, wherein said one or more client devices are digital video recorders.

10. The method of claim 8, wherein said one or more client devices are connected to the same home network.

11. The method of claim 8, wherein an update server provides said shared household key to each of said one or more client devices.

12. A method of enabling media recording compatibility between client devices, comprising:
transferring a recording from a first memory device to a second memory device, said recording having been made by a first client device and having been encrypted by said first client device using a household key, and said second memory device being accessible by a second client device; and
provisioning said household key onto said second client device, such that said second client device is configured to use said household key to decrypt and play back said recording from said second memory device,
wherein said first client device and said second client device are both associated with the same subscriber identifier, and said household key is associated with said subscriber identifier,
wherein the household key is limited for use to encrypt and decrypt content stored on the first client device, the second client device and other client devices in a group of client devices located within a household, and
wherein when one of the group of client devices in the household has content encrypted with the household key the content can be played back after being received from another one of the group of client devices in the household, and
wherein the household key is provided from an update server to the group of devices, with the household key and the associated subscriber identifier being provided only to devices within the household identified by the subscriber identifier, the update server being operated by the manufacturer of the group of devices.

13. The method of claim 12, wherein said first memory device is an external backup drive.

14. The method of claim 12, wherein said first memory device is a remote drive.

15. The method of claim 12, wherein said second client device is a replacement for said first client device after said first client device has failed.

16. The method of claim 12, wherein said first client device and said second client device are connected to a home network and said recording is transferred from said first memory device to said second memory device over said home network.

17. The method of claim 16, wherein DTCP-IP link protection is used to protect said recording as it is transferred over said home network.

* * * * *